United States Patent [19]

Takagi et al.

[11] 4,350,868  
[45] Sep. 21, 1982

[54] FOLLOW-UP CONTROL APPARATUS FOR CONTROLLING THE MOVEMENT OF A WELDING WEAVING DEVICE

[75] Inventors: Masaharu Takagi, Takatsuki; Yoshinori Nishida, Suita, both of Japan

[73] Assignee: Matsushita Electric Industrial Co., Ltd., Osaka, Japan

[21] Appl. No.: 703,817

[22] Filed: Jul. 9, 1976

[30] Foreign Application Priority Data

Jul. 14, 1975 [JP] Japan ................................ 50-86513  
Dec. 4, 1975 [JP] Japan ............................. 50-145422  
Dec. 11, 1975 [JP] Japan ............................. 50-148166  
Feb. 20, 1976 [JP] Japan ................................ 51-18100

[51] Int. Cl.³ .............................................. B23K 9/12  
[52] U.S. Cl. ........................... 219/137 R; 219/124.22; 219/125.12  
[58] Field of Search ......... 219/137 R, 137 PS, 131 F, 219/124, 125 R, 125 PL, 124.22, 124.34, 125.12; 228/27, 28

[56] References Cited

U.S. PATENT DOCUMENTS

| 3,230,341 | 1/1966 | Blackburn | 219/125 R |
| 3,346,807 | 10/1967 | Wood et al. | 219/124 |
| 3,646,309 | 2/1972 | Smith, Jr. et al. | 219/125 PL |
| 3,818,176 | 6/1974 | Brown | 219/124 |

FOREIGN PATENT DOCUMENTS

| 1913126 | 11/1969 | Fed. Rep. of Germany | 219/125 PL |
| 147705 | 11/1962 | U.S.S.R. | 219/125 PL |
| 253974 | 4/1970 | U.S.S.R. | 219/137 R |
| 288189 | 2/1971 | U.S.S.R. | 219/124 |
| 371041 | 5/1973 | U.S.S.R. | 219/125 PL |

*Primary Examiner*—C. C. Shaw  
*Attorney, Agent, or Firm*—Stevens, Davis, Miller & Mosher

[57] ABSTRACT

A method and apparatus for follow-up controlling the weaving movement of a weaving device in consumable electrode type arc welding, in which welding currents at both ends of the left and right side of the weaving motion of the torch with respect to a welding line are detected and compared. If the detected welding currents are not equal, the weaving device mounting the torch is shifted either to the left or right with respect to the welding line depending upon which of the welding currents is larger until the detected welding currents become equal to each other.

7 Claims, 16 Drawing Figures

FOLLOW-UP CONTROL APPARATUS FOR CONTROLLING THE MOVEMENT OF A WELDING WEAVING DEVICE

The present invention relates to consumable electrode type arc welding in which a welding torch weaves or zigzags along a welding line, and more specifically, to a method and apparatus of follow-up control of the movement of the weaving device mounting the torch.

It is an object of the present invention to provide a follow-up control apparatus which enables adjustment and maintainance of the weaving device at a correct position during the weaving movement thereof along the welding line.

According to one aspect of the present invention, the amount of welding currents at positions of the welding torch including in the vicinity of left and right ends of the weaving movement is detected, and the detected welding currents in the vicinity of the left and right end positions of the torch are compared, and then the position of the weaving device mounting the torch is controlled by moving it either to the left or right with respect to the welding line so that the welding currents compared are substantially equal.

The present invention will be more fully described together with the prior art technique by way of contrast referring to the attached drawings in which.

Figure 1:
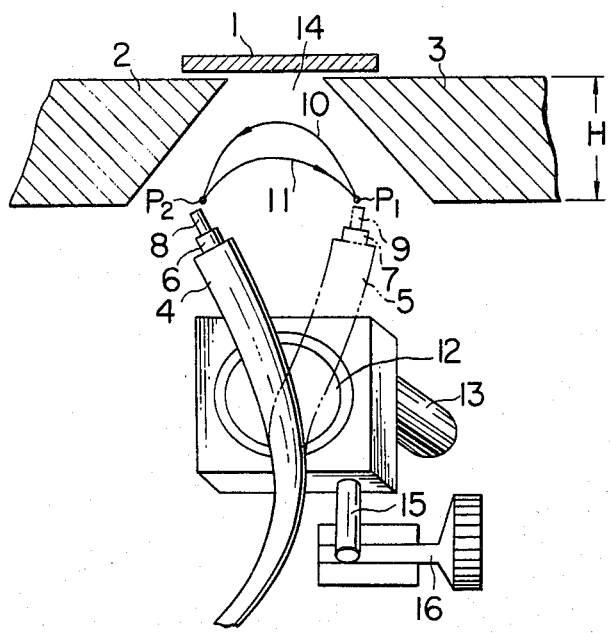
FIG. 1 illustrates the prior art weaving welding, in particular a general arrangement of a weaving device with respect to V-bevelled steel plates.

FIGS. 1, 2, 3 and 4 show examples of welding by prior art weaving welding method. Those drawings show the examples of the weaving welding method in which V-vebelled steel plates are butt welded by vertical welding using weaving. In FIG. 1, numeral 1 denotes a strap mounted on backsides of the V-bevels, 2 denotes a left steel plate disposed on the left side as viewed from the front side of the V-bevel, 3 denotes a right steel plate disposed on the right side as viewed from the front side of the V-bevel, 4 and 5 denote welding torches in a consumable electrode type arc welding method, 6 and 7 denote tips in this welding method, 8 and 9 denote consumable electrodes or consumable wires, 10 and 11 denote weaving patterns (traces), $P_1$ and $P_2$ denote opposite ends of the weaving patterns, 12 denotes a motive force source for causing weaving movement, 13 denotes a drive motor which is a part of the motive force source 12, 14 denotes a space between the V-bevels, 15 denotes a holder for the weaving motive force source 12, and 16 denotes a lateral movement adjustment unit for laterally moving the holder 15. The welding torch 4 is mounted on the motive force source 12 and fixed thereto. The motive force source 12, 13 and holder 15 constitute a weaving device.

When the torch is moved to trace the pattern 10 and 11 and when the torch is positioned at the right end point $P_1$, the elements of the torch are represented by torch 5, tip 7 and consumable wire 9. They are shown by a dotted line. On the contrary, when the torch is at the left end $P_2$ of the weaving movement, the elements of the torch are shown as the torch 4, the tip 6 and the consumable wire 8. They are shown by a solid line. Letter H represents a thickness of the steel plates 2 and 3.

The weaving patterns are now explained. In the weaving method, an arc occurs at the point $P_1$ and traces the pattern 10 to the point $P_2$ thence traces the pattern 11, which passes in front of the pattern 10, back to the point $P_1$. This process is repeated. By welding the space 14 between the V-bevels, the weld 17 of a high welding quality is obtained as shown in FIG. 2.

Figure 2:
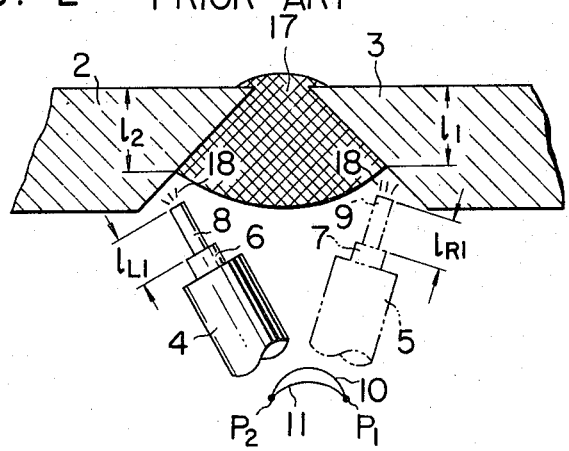
FIG. 2 illustrates, in particular, a satisfactory welding in the prior art weaving welding shown in FIG. 1.

In FIG. 2, $l_1$ represents a distance between the backside of the right steel plate 3 and a junction of the frontside of the weld 17 with the bevel of the steel plate 3. That is, $l_1$ represents the weld height at the right of the weld. Similarly, $l_2$ represents the weld height at the left of the weld. $l_{R1}$ denotes a separation between the right tip 7 and an arc generating point 18. That is, $l_{R1}$ represents a projection length of the consumable wire at the right end $P_1$ of the weaving pattern. Similarly, $l_{L1}$ represents a projection length of the consumable wire at the left end $P_2$ of the weaving pattern. If the welding torch exactly follows the bevelling line in the space 14, that is, if it is in the welding torch positions as shown in FIGS. 1 and 2, the right and left weld heights $l_1$ and $l_2$ of the weld 17 are substantially the same as shown in FIG. 2. In this case, the projection lengths $l_{R1}$ and $l_{L1}$ of the consumable wire at the right and left ends are substantially the same.

Figure 3:
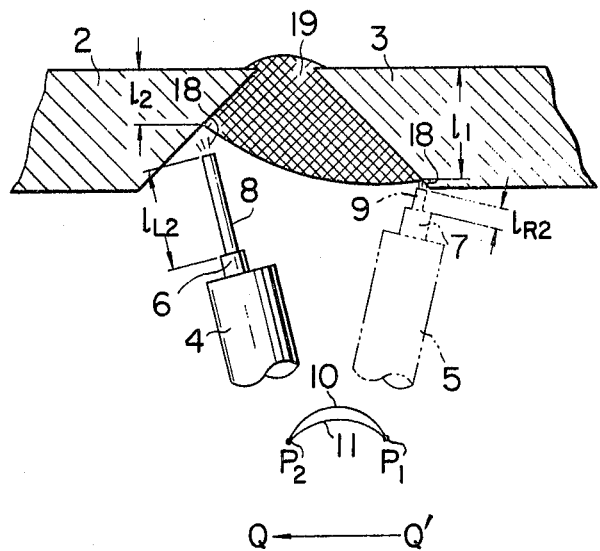
FIG. 3 illustrates, in particular, an unsatisfactory welding in the prior art welding shown in FIG. 1.

FIG. 3 illustrates a case where the weaving device or the motive force source 12 for causing the generation of weaving patterns 10 and 11 has shifted to the right for certain reasons. In this case, an unsatisfactory weld 19 is obtained, in which the right weld height $l_1$ is very high relative to the left weld height $l_2$. Namely, it is seen that if the weaving device shifts to the right, the resulting weld is also shifted to the right. In this case, the projection length of the consumable wire $l_{R2}$ at the right end is less than the projection length $l_{L2}$ at the left end. That is, if a truck (not shown) on which the weaving motive force source is mounted does not travel along the bevelling line on a track, the above phenomenon is observed. Even when the truck travels on the track along the bevelling line, a satisfactory weld 17 may not be obtainable in the space 14 if there exist mechanical play in the weaving motion or a twist in the consumable wire, and the weld 19 as shown in FIG. 3 results. Similar phenomenon is observed in fillet welding.

Heretofore, whenever the rightward biased weld 19 as shown in FIG. 3 has resulted, an experienced welding operator adjusted the lateral movement adjusting unit 16 to move the weaving device 12, 13, 15 mounting the welding torch to the left, that is, in the direction of Q'→Q. Therefore, the arc generating point 18 must be always monitored in order to obtain the satisfactory weld 17. Contrary to the case of FIG. 3, when the weld is shifted to the left, the welding operator must make adjustment in the opposite way to the case of FIG. 3.

Figure 4:
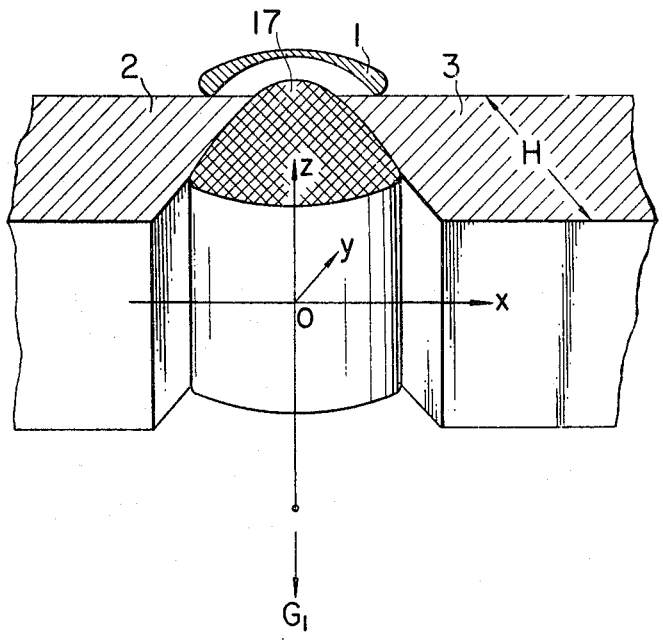
FIG. 4 illustrates, in particular, welded V-bevelled steel plates with respect to the X, Y and Z coordinates.

FIG. 4 is shown in order to facilitate the overall understanding of FIGS. 1, 2 and 3. Letter Z denotes a direction of welding line, X denotes a lateral direction as viewed across the bevel, Y denotes a direction of the thickness of the steel plates 2 and 3, and $G_1$ denote a direction of gravity. The truck is supported on the steel plate 2 or 3 such that the truck travels in the direction of Z. FIGS. 1, 2 and 3 are sectional views taken in the X-Y plane of FIG. 4. In prior art a bevelling line tracking apparatus has used a mechanical roll system in a limited area in the non-weaving of the welding torch. In this system, since the roll contacted with the bevels of the steel plates 2 and 3, it was sensitive to variations in welding sputter and the bevel.

The present invention is aimed at to overcome the prior art problems and to provide satisfactory bead weld in the weaving welding method, wherein when the bead weld is shifted to the left or right for certain reasons the left or right shift is detected by the difference in the left and right welding conditions for causing the welding torch to exactly track the bevelling line.

Figure 5:
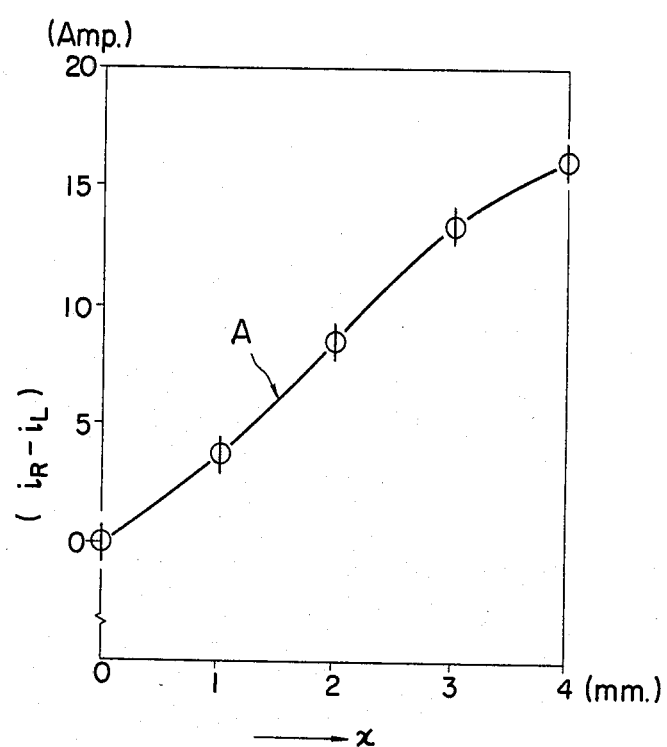
FIG. 5 is a graph showing the welding current difference at the left side and right side ends of the weaving motion of the torch with respect to the displacement of the weaving device from a correct position.

FIG. 5 shows a graph of a welding current at left and right ends including left and right end areas of the weaving. The weaving device 12, 13, 15 and the welding torch elements 8, 6, 4 mounted on the device were initially arranged substantially at the center facing the bevel space 14. That is, the weaving patterns 10 and 11 are established at the center in the bevel space 14 as shown in FIG. 1. In FIG. 5, this position is set to $X \approx 0$. Thereafter, the welding torch and the weaving device were moved to the right in the direction of X-axis in FIG. 4 by the lateral movement adjusting unit 16. Putting the welding current at the right of the weaving (at and near the point $P_1$) as $i_R$ and the welding current at the left (at and near the point $P_2$) as $i_L$, differential welding currents $(i_R - i_L)$ at various positions along the X-axis were plotted, as shown in FIG. 5. The graph was plotted under the conditions that the consumable wire was a soft steel solid wire of 1.2 mm diameter, the steel plate thickness was about 25 mm, the V-bevel angle was 45°, the feeding rate of the consumable wire was about 50 g/min, the average welding current was about 170 amperes, and the shielding gas was $CO_2$ gas. Visual observation showed that the bead weld was satisfactory as shown by 17 when X ranged from 0 mm to about 1 mm, and the bead weld was not satisfactory as shown by 19 when to right shift exceeded about 1 mm, that is, when X ranged from about 1 mm to 4 mm. FIG. 5 shows that the more the weaving device is moved rightward, the more the current $(i_R - i_L)$ increases as indicated by the curve A. This phenomenon is beleved to be due to the Joule effect which depends on the projection length of the consumable wire. The curve A shows that if $l_{L2} > l_{R2}$, then $i_L < i_R$ as shown in FIG. 3 and FIG. 5. Similarly, when the weaving device is shifted to the left along the X-axis, the realtion of $i_L > i_R$ occurs. If X ranges from about 0 mm to −1 mm (1 mm shifted to the left), the resulting bead weld is satisfactory as shown by 17. The magnitude of the current $(i_R - i_L)$ at $X \approx 1$ mm is in the order of 3 to 5 amperes as seen from the curve A. It is thus seen that if the welding torch and the weaving device are shifted from the center position of the bevel space to the left or right for certain reasons, the welding torch and the weaving device may be adjusted to assure the relation if $i_R \approx i_L$. In the case of FIG. 5, the welding torch and the weaving device may be moved either to the left or to the right such that the absolute value of the current $(i_R - i_L)$ ranges from 0 ampere to 3–5 amperes.

Figure 6:
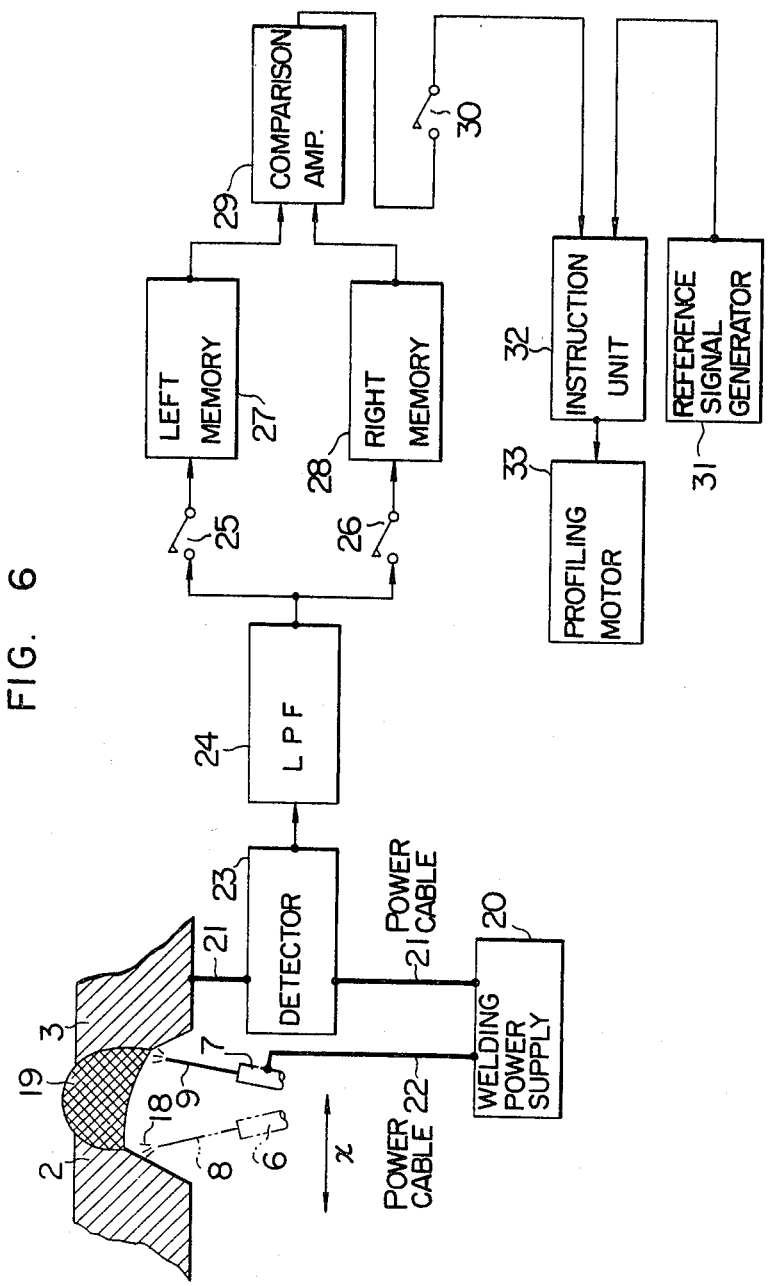
FIG. 6 is a schematic block diagram of a follow-up control apparatus according to the present invention.

FIG. 6 shows an embodiment for implementing the above welding line follow-up control method. In FIG. 6, numeral 20 denotes a welding power supply, 21 a power cable (ground side), 22 a power cable (positive side) 23 a detector for detecting a welding current, 24 a low-pass filter for eliminating high frequency components of the detected current and passing low frequency components of the detected current, 25 designates a left switch which is closed on left side including left end area of the weaving, 26 a right switch which is closed on right side including right end area of the weaving. The switches 25 and 26 may be conventional ones or they may be semiconductor switches such as transistors, 27 designates a left memory for storing the welding current on the left side of the weaving 28 a right memory for storing the welding current on the right side of the weaving, 29 a comparison amprifier for comparing the left and right welding currents stored in the left and right memories 27 and 25 to amplify a difference between the left and right welding currents, and 30 a comparison switch. Whenever the right welding current is accumulated or integrated n times (n being an integer such as 1, 2, 3, ...) by the right memory 28, the comparison switch 30 is closed to pass the output of the composition amplifier 29. The switch 30 may be inserted both between the left memory 27 and the comparison amplifier 29 and between the right memory 28 and the comparison amplifier 29. Numeral 31 designates a reference signal generator which, for example, generates a signal corresponding to ±Io amperes (Io>0). The absolute values for +Io and −Io are not necessarily the same. Numeral 32 designates an instruction unit while 33 denotes a profiling motor. Thus, in the present embodiment, unlike the technique shown in FIG. 1, the lateral movement adjusting unit 16 is not manually adjusted by a welding operator. In the FIG. 6 embodiment, the motor 33 is coupled to the lateral movement adjusting unit 16 so that the motor 33 is driven forwardly or backwardly depending on the instruction from the instruction unit 32 to move the weaving device and the welding torch to the left or right. The left welding current stored in the left memory 27 is expressed by $$I_L = \sum_{n=1}^{n} i_{L(n)}.$$

and the right welding current stored in the right memory is expressed by $$I_R = \sum_{n=1}^{n} i_{R(n)}.$$

Figure 7:
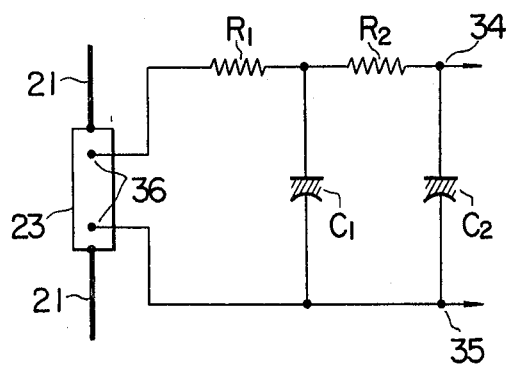
FIG. 7 illustrates a diagram of a low-pass filter which is suitably used in the follow-up control apparatus shown in FIG. 6.
Figure 8:
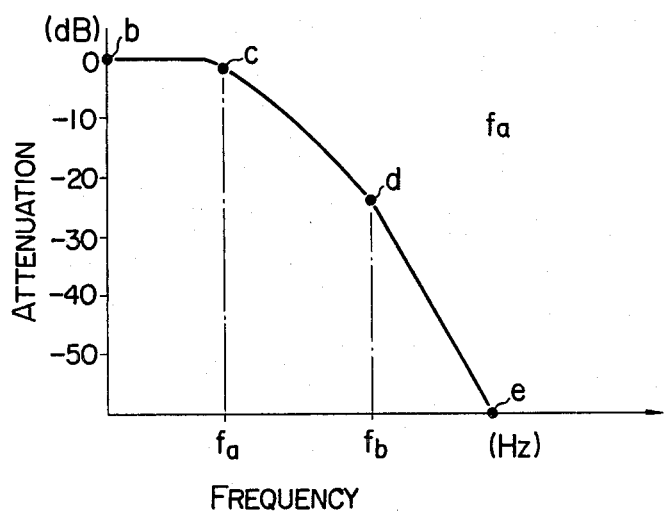
FIG. 8 is a graph illustrating an attenuation characteristic of the low-pass filter shown in FIG. 7.

They indicate the sums of samplings for n weaving cycles for the left and right currents. Here, one weaving cycle is defined by one revolution of the welding torch along the patterns 10 and 11 in FIG. 1. Alternatively, instantaneous currents $i_{L(n)}$, $i_{R(n)}$ at the left and right ends in the respective cycles may be integrated for the time T and added together to produce $$I_L = \sum_{n=1}^{n} \int_O^T i_{L(n)} dt \text{ and } I_R = \sum_{n=1}^{n} \int_O^T i_{R(n)} dt$$

as the left and right accumulations. In this case the closing periods of the switches 25 and 26 are set to T. The output from the switch 30 is given by $\alpha(I_R-I_L)$, where $\alpha$ is an amplification factor of the comparison amplifier 29 ($\alpha>0$). The instruction unit 32 operates in the following manner. When the relations of $\alpha(I_R-I_L)>0$ and $\alpha(I_R-I_L)\geq +I_o$ are met, the instruction unit 32 issues an instruction to cause the weaving device together with the welding torch to move to the left along the X-axis. On the other hand, when the relations of $\alpha(I_R-I_L)<0$ and $\alpha(I_R-I_L)\leq -I_o$ are met, the instruction unit 32 issues an instruction to cause the weaving device and the welding torch to move to the right. If the relation of $|\alpha(I_R-I_L)| <I_o$ is met, the instruction unit 32 does not issue any instruction to cause the weaving device and the welding torch to move. Alternatively, the comparison amplifier 29 may be constructed to produce an output of $\alpha(i_L-i_R)$. Preferably, the increment of movement to the left or right for each instruction is preset to a given amount $\Delta X$ mm. After the weaving device and the welding torch have been moved, or after the instruction unit 32 has issued the instruction, the contents of the left and right memories 27 and 28 are reset to zero. By repeating the above operation in the above sequence, the tracking of the welding line is attained. As the detector 23, a current detecting shunt may be used. Furthermore, the output from the detector 23 may be taken from the positive side (cable 22) instead of the ground side (cable 21). It is considered that the frequency components of the welding current include a frequency component $f_F$ due to non-uniformity in the feeding of the consumable wire, a frequency components $f_S$ due to the tendency of short-circuiting of the consumable wire, and a frequency component $f_W$ due to the weaving. On the other hand, the frequency compoennt of the welding current required for the purpose of the welding line follow-up must be due to the projection length of the consumable wire. Namely, the frequency components $f_F$ and $f_S$ should be eliminated for the purpose of the present invention. An experiment showed that fs ranged from 20 Hz to 100 Hz and $f_F$ ranged from 2 Hz to 10 Hz. The fw in the case of FIG. 5 was 0.2 Hz to 0.3 Hz. Accordingly, it is desirable to eliminate the welding current consisting of the frequency components $f_F$ and fs by the low-pass filter 24. An example of the filter 24 which satisfies the above requirement is shown in FIG. 7, which is a two-stage RC filter. In FIG. 7, 23 designates the current detection shunt, $R_1$ and $R_2$ resistors, $C_1$ and $C_2$ capacitors, 34 and 35 output terminals of the filter, and 36 output terminals of the shunt 23. FIG. 8 shows an attenuation characteristic of the filter of FIG. 7 the abscissa represents the frequency in logarithmic scale in Hz, and the ordinate represents the attenuation in dB, and fa and fb designate crossover frequencies (fa<fb). The curve plotting the points b, c, d, e represents the amount of attenuation for the respective frequency. The attenuation between the points c and d is 6 dB/oct., and the attenuation between the points d and e is 12 dB/oct. In the present example, $R_1$, $R_2$, $C_1$ and $C_2$ were selected to have the frequency fa of about 0.2 Hz and the frequency fb of about 1.27 Hz, with the relations $R_1 \approx R_2$ and $C_1 \approx C_2$ being met. In this case, the relation of fb≈6.2 fa was obtained. It should be noted that FIGS. 7 and 8 are merely exemplary, and any filter which can eliminate the frequency components fs and $f_F$ of the welding current to the extent to allow the welding line tracking, may be used.

Figure 9:
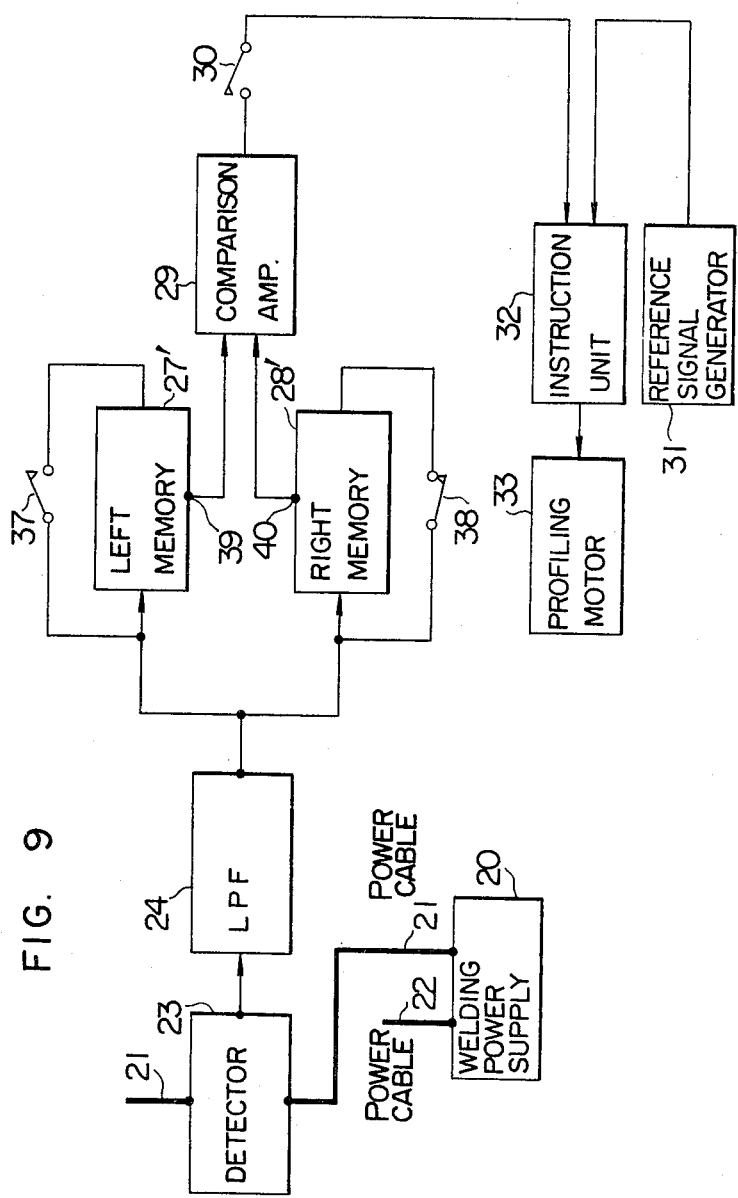
FIG. 9 is a schematic block diagram of another embodiment of the follow-up control apparatus.

FIG. 9 shows another embodiment of the present invention. In FIG. 9, 27' and 28' designate memories which store the output from the low-pass filter 24 only when the associated switches 37 and 38 are open. The switch 37 is opened on the left side of weaving to allow the left memory 27' to store the left welding current. The switch 38 is opened on the right side of the weaving to allow the right memory 28' to store the right welding current. Numerals 39 and 40 designate the memory output terminals.

Figure 10:
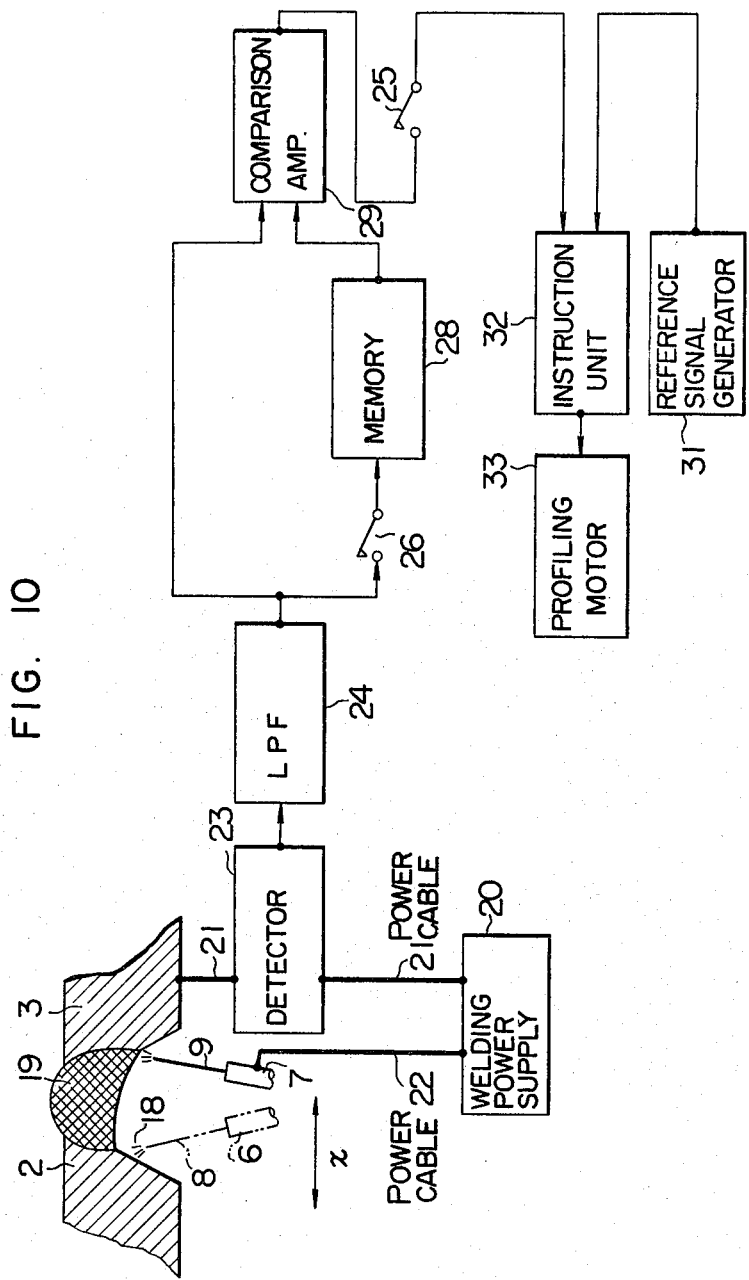
FIG. 10 is a schematic block diagram of still another embodiment of the follow-up control apparatus.

FIG. 10 shows a simplified version of FIG. 6. In FIG. 10, the circuit comprising the switch 25 and the left memory 27 in FIG. 6 is shortcircuited, and the switch 30 in FIG. 6 has been replaced by the switch 25 in FIG. 10. The memory 28 stores the right welding current one time and the comparison amplifier 29 continuously compares the stored right welding current with the welding current at various torch positions in one weaving cycle. The amplified difference between the stored right welding current $i_R$ and the left welding current $i_L$ is taken out of the switch 25. That is the output from the switch 25 is $\alpha(i_R-i_L)$. The embodiment of FIG. 10 corresponds to the embodiment of FIG. 6 where the number of times of samplings n is selected to 1. The experiment showed that the best control was attained when n=1. As a modification of FIG. 10 embodiment, the switch 26 and the right memory 28 in FIG. 6 may be shortcircuited and the switch 30 in FIG. 6 may be replaced by the switch 26. In the embodiments of FIGS. 6, 9, 10 and 11, when the welding current is small, an amplifier may be inserted after the filter 24 to amplify the welding current. In the drawings, those units and apparatus having the like numerals or symbols function in the same way.

Figure 11:
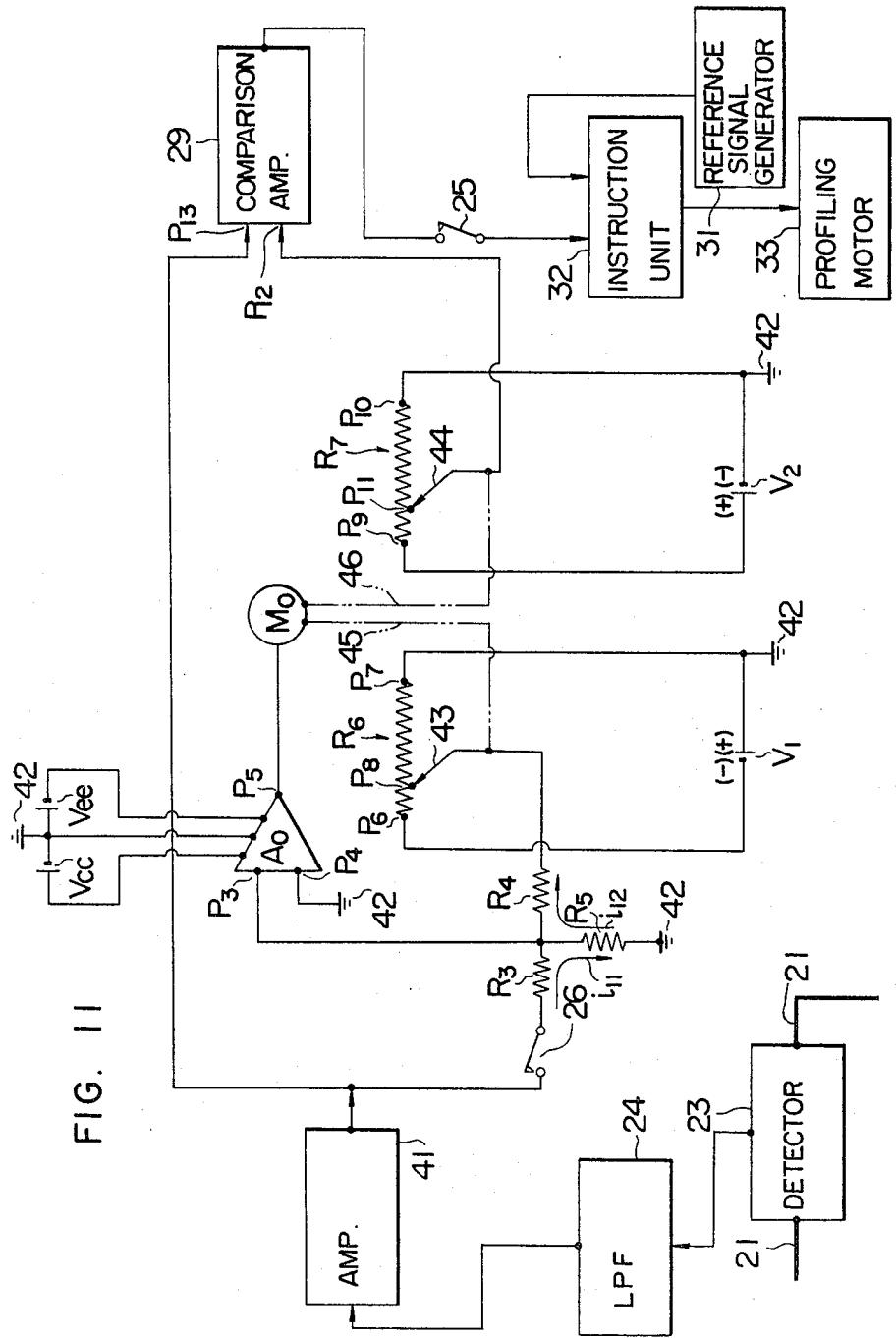
FIG. 11 is a detailed diagram of memory circuit of FIG. 10.

FIG. 11 illustrates an example of the detail of the memory 28 and the associated circuits in the embodiment of FIG. 10. The same numerals or symbols represent the like units. Numeral 41 designates an amplifier and 42 designates ground. All points designated by 42 are connected in common in the circuit. Ao denotes a servo amplifier, Mo a servo motor, $R_3$, $R_4$, $R_5$ resistors, $R_6$ and $R_7$ ganged potentiometers, $V_1$, $V_2$, $V_{cc}$, $V_{ee}$ constant voltage sources. Points $P_3$ and $P_4$ designate input terminals to the servo amplifier Ao, point $P_5$ an output terminal of the servo amplifier Ao. The servo motor Mo is driven by the output from the servo amplifier Ao. Points $P_6$ and $P_7$ designate opposite ends of the potentiometer $R_6$, point $R_8$ designates a movable point on the potentiometer $R_6$, points $P_9$ and $P_{10}$ denote opposite ends of the potentiometer $R_7$, point $P_{11}$ denotes a movable point on the potentiometer $R_7$, points $P_{12}$ and $P_{13}$ denote input terminals to the comparison amplifier 29, 43 denotes a lever electrically connected to the potentiometer $R_6$ for allowing variance of the resistance thereof, 44 denotes a lever electrically connected to the potentiometer $R_7$, 45 and 46 denote link shafts for mechanically linking the levers 43 and 44 to the output shaft of the servo motor Mo. The resistances of the potentiometers $R_6$ and $R_7$, that is, the resistance between the points $P_6$ and $P_7$ and the resistance between the points $P_9$ and $P_{10}$ are substantially equal and represented by Ro. Then, the variable resistance of the potentiometer $R_6$, that is, the resistance between the points $P_7$ and $P_8$ is approximated by Ro x (the length between points $P_7$ and $P_8$)/(the length between the points $P_7$ and $P_6$). This variable resistance is repreented by $R_{6(x)}$. Similarly, the variable resistance of the potentiometer $R_7$, that is, the resistance between the points $P_{10}$ and $P_{11}$ is approximated by Ro x (the length between the points $P_{10}$ and $P_{11}$)/(the length betwen the points $P_{10}$ and $P_9$). This resistance is expressed by $R_{7(x)}$. Since the potentiometers $R_6$ and $R_7$ are ganged, $R_{6(x)}$ is substantially equal to $R_{7(x)}$. The resistors $R_3$ and $R_4$ are selected to be substantially equal. The absolute values of $V_1$ and $V_2$ are adjusted to be substantially equal, and they are represented by $E_{10}$. Then, the voltage between the point $P_8$ of the potentiometer $R_6$ and the ground 42 is given by $-(R_{6(x)}/Ro)\times E_{10}$. Similarly, the voltage between the point $P_{11}$ and the ground 42 is given by $+(R_{7(x)}/Ro)\times E_{10}$.

The memory function of the system is now explained. If the switch 26 is closed at the right end of the n-th weaving cycle, a circuit current $i_{11}$ corresponding to the right end welding current flows through the resistors $R_3$ and $R_5$. Since the voltage between the points $P_8$ and $P_7$ is $-(R_{6(x)}/Ro)\times E_{10}$, a current $i_{12}$ flows through the resistors $R_4$ and $R_5$ to the ground 42. Therefore, a voltage $(i_{11}-i_{12})\times$ (the resistance of the resistor $R_5$) is applied across the input points $P_3$ and $P_4$ of the servo amplifier Ao. The servo amplifier Ao functions to drive the servo motor Mo such that the voltage across the points $P_3$ and $P_4$, that is, the deviation input reaches zero, and the servo motor Mo moves the levers 43 and 44 in linked manner to move the points $P_8$ and $P_{11}$ by the same amount. Namely, the levers 43 and 44 of the potentiometers are moved to assure the relation of $i_{11}\approx i_{12}$ so that the resistances thereof are changed by $\Delta$Ro to store corresponding voltages between the points $P_8$ and $P_7$ and the points $P_{11}$ and $P_{10}$.

When the switch 26 is subsequently opened, the levers 43 and 44 do not move from the positions corresponding to the $i_{11}$ signal until the switch 26 is next closed. That is, the voltage signal corresponding to $i_{11}$ has been stored between the points $P_{11}$ and $P_{10}$ as the right welding current. Namely, the stored content at the (n−1)th weaving cycle is $+(R_{7(x)}/Ro)\times E_{10}$, and the stored content at the n-th cycle, that is, the stored content corresponding to $i_{11}$ is $+[(R_{7(x)}+\Delta Ro]\times Eo$. The stored content of the right welding current is applied to the point $P_{12}$. On the other hand, the welding current during weaving is continuously applied to the point $P_{13}$. The signal applied to the point $P_{12}$ and the signal applied to the point $P_{13}$ are compared and amplified in the comparison amplifier 29, and the difference between the stored right welding current and the left welding current is taken out of the switch 25 only when the weaving cycle reaches at its left end.

The power supplies $V_{cc}$ and $V_{ee}$ are bipolar power supplies for the servo amplifiers Ao, and the absolute values of $V_{cc}$ and $V_{ee}$ are usually substantially equal.

Figure 12:
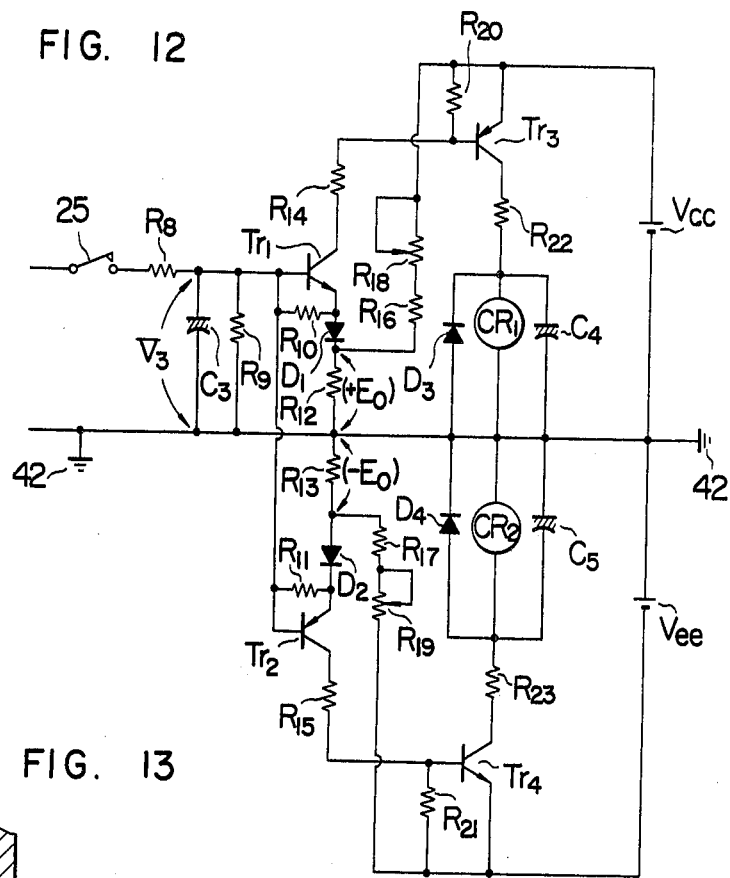
FIG. 12 is a detailed diagram of reference and instructing circuits shown in FIG. 10.

FIG. 12 illustrates an example of a detailed circuit configuration of the reference signal generator 31 and the instruction unit 32 shown in FIG. 10. In FIG. 12, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$ are resistors, of which $R_{18}$ and $R_{19}$ are potentiometers. $C_3$, $C_4$, $C_5$ are capacitors, $T_{r1}$, $T_{r2}$, $T_{r3}$, $T_{r4}$ are transistors, of which $T_{r1}$ and $T_{r4}$ are NPN transistors and $T_{r2}$ and $T_{r3}$ are PNP transistors. $D_1$, $D_2$, $D_3$, $D_4$ are diodes, $V_{cc}$ and $V_{ee}$ are power supplies shown in FIG. 11, $CR_1$ and $CR_2$ are relays, of which electromagnet coils are shown in the drawing. A voltage across the resistor $R_{12}$ is given by $+Eo$ and a voltage across the resistor $R_{13}$ is given by $-Eo$. The voltages $\pm Eo$ are the reference signals of the reference signal generator 31, of which the $+Eo$ voltage corresponds to the welding current signal Io in FIG. 6 while the $-Eo$ voltage corresponds to the welding current $-Io$. A voltage across the capacitor $C_3$ is given by $V_3$. The voltage $V_3$ corresponds to a differential signal, after being amplified, between the right end welding current and the left end welding current. The voltage $V_3$ when $\alpha(i_R-i_L)>0$ is set to be positive and the voltage $V_3$ when $\alpha(i_R-i_L)<0$ is set to be negative. The voltage $+Eo$ is derived by dividing the $V_{cc}$ output by the resistors $R_{18}$, $R_{16}$ and $R_{12}$ and it can be adjusted by the potentiometer $R_{18}$. The voltage $-Eo$ is derived by dividing the $V_{ee}$ output by the resistors $R_{19}$, $R_{17}$ and $R_{13}$, and it can be adjusted by the potentiometer $R_{19}$. Those elements constitute the reference circuit 31. When the relay $CR_1$ is energized by the application of a predetermined voltage, it generates a command to cause the welding torch and the weaving apparatus to move to the left. On the other hand, when the relay $CR_2$ is energized, it generates a command to cause the welding torch and the weaving device to move to the right. The circuit operates in the following manner. When $V_3>0$ (that is, when the welding torch and the weaving device are deviated to the right) and $V_3\geq +Eo$, the transistor $T_{r1}$ operates to saturate the transistor $T_{r3}$, which causes a voltage from the power supply $V_{cc}$ to be applied across the relay $CR_1$ to energize the same. On the other hand, when $V_3<0$ (That is, when the welding torch and the weaving device are deviated to the left) and $V_3\leq -Eo$, the transistor $T_{r2}$ is operated to saturate the transistor $T_{r4}$, which causes a voltage from the power supply $V_{ee}$ to be applied across the relay $CR_2$ to energize the same.

Figure 13:
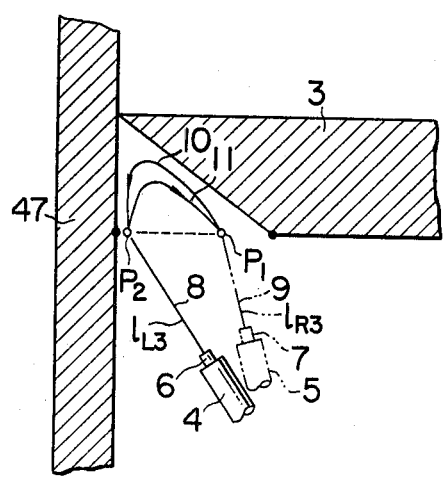
FIG. 13 shows another technique of weaving welding according to the invention which is suitable to a single V-bevelled steel plate welding.
Figure 14:
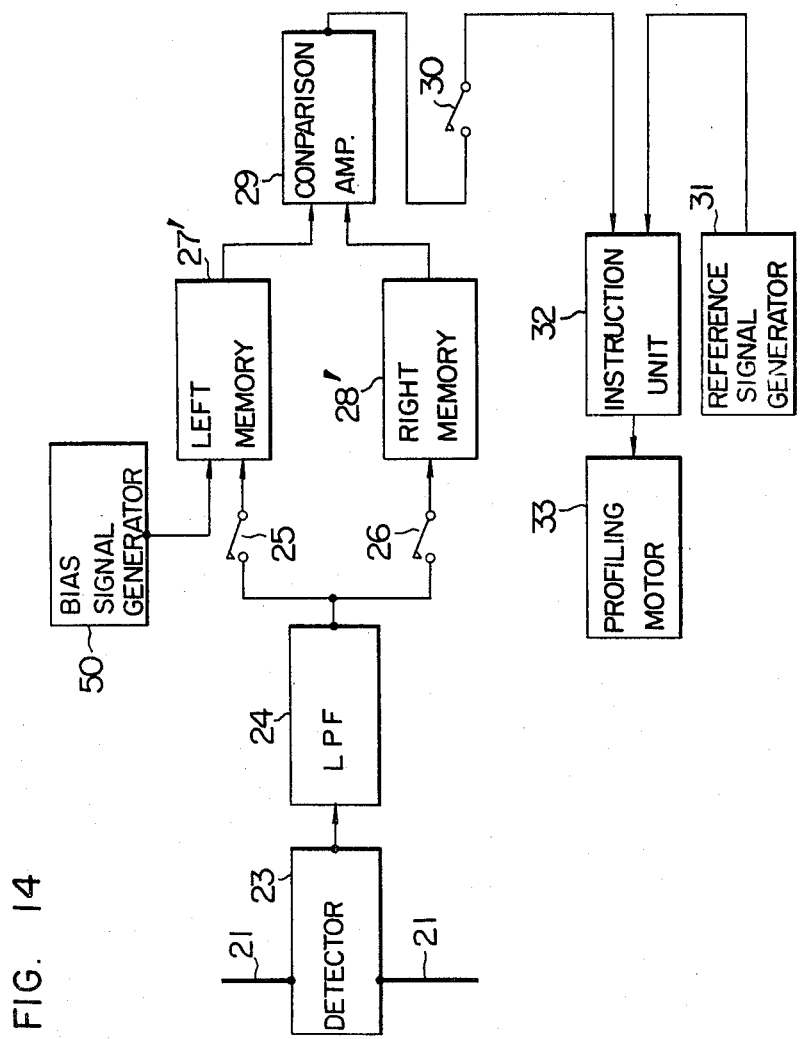
FIG. 14 is a schematic block diagram of still another embodiment in which a bias signal generator circuit is added to the circuitry of FIG. 6.
Figure 15:
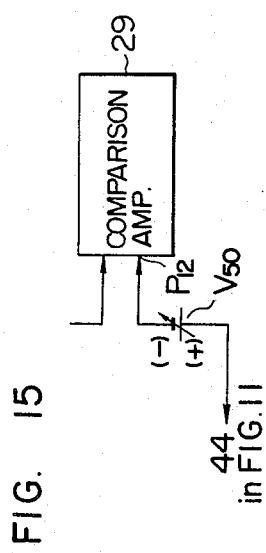
FIG. 15 shows in detail a circuit arrangement of the bias signal generator shown in FIG. 14.

FIG. 3 illustrates single-bevel vertical welding by the weaving method shown in FIG. 1. 47 designates a steel plate, $l_{R3}$ designates right side wire projection length, $l_{L3}$ designates left side wire projection length. When the welding by the single bevel as shown in FIG. 13 is carried out, the following process conditions are set. As shown, the relation of $l_{L3}>l_{R3}$, that is, an asymmetric relation between the weaving patterns 10 and 11 established. The operation of the welding line tracking system when the left and right wire projection lengths are differently established is now explained. In this case, the right end welding current $i_{R3}$ is larger than the left end welding current $i_{L3}$. That is, $i_{R3}>i_{L3}$. By supplying an additional current $I_3$ which causes the relation of $i_{R3}\approx i_{R3}+I_3$ to be met, a similar welding line tracking control to that of FIG. 6 can be attained. In particular, in FIG. 6, a signal corresponding to $I_3$ may be prestored in the left memory 27 or added thereto subsequently so that the comparison amplifier 29 compares $(i_{L3}+I_3)$ with $i_{R3}$ to effect the same control as in the case of FIG. 6. For example, as shown in FIG. 14, a bias signal generator 50 is further added to the circuit arrangement of FIG. 6. The bias signal generator 50 is connected to the left memory 27' which stores an output signal representing a welding current of the left side weaving motion of the torch applied through the switch 25. Since the bias signal generator 50 generates a bias signal corresponding to the current $I_3$, the output of the left memory 27' is $(i_{L3}+I_3)$. Thus, the comparison amplifier 29 compares the $(i_{L3}+I_3)$ with $i_{R3}$ and amplifies the result thereof. Subsequent operations of the circuitry of FIG. 14 are similar to that of FIG. 6 described above. More specifically, as illustrated in FIG. 15 which shows only a part of the circuitry of FIG. 11, an adjustable signal source $V_{50}$ is inserted between the lever 44 and the input point $P_{12}$ of the comparison amplifier 29. The adjustable signal source $V_{50}$ is adjusted to generate a voltage signal $V_{50}$ which corresponds to the current signal $I_3$ in the polarity as shown in FIG. 15. As a result, a signal developed between the point $P_{12}$ and the grounded point 42 (FIG. 11) corresponds to $(i_{R3}-I_3)$. Thus, the comparison amplifier 29 compares $(i_{R3}-I_3)$ with the left side welding current signal $i_{L3}$ as described above.

Figure 16:
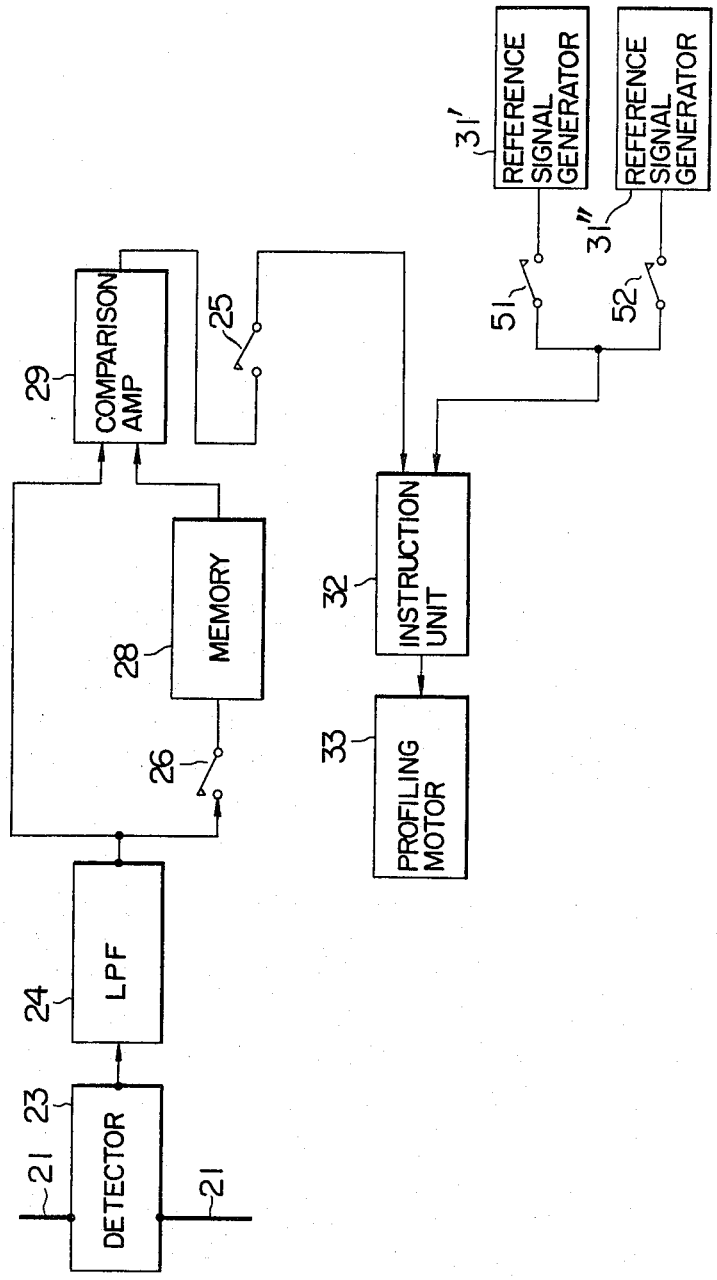
FIG. 16 is a schematic block diagram of yet another embodiment in which two reference signal generators are provided as a variance of FIG. 10.

As an alternative, in FIG. 10, the output of the reference circuit 31 is set in the following manner. That is, two different reference levels, $(I_o+I_3)$ and $(-I_o+I_3)$ are established, and when $\alpha(i_{R3}-i_{L3}) > I_o+I_3$, the weaving device is moved to the left and when $\alpha(i_{R3}-i_{L3}) < -I_o+I_3$, the weaving device is moved to the right. Referring to FIG. 16 which is a variance of the circuitry of FIG. 10, there are provided with two reference signal generators 31' and 31". The reference signal generator 31' generates an output signal representing $(+I_o+I_3)$, while the other signal generator 31" generates an output signal representing $(-I_1+I_3)$. In other words, the output $\pm I_o$ of the reference signal generator 31 in FIG. 10 is effectively balanced or compensated for the unsymmetry of the weaving pattern. When the output delivered through the switch 25, which corresponds to $\alpha(i_{R3}-i_{L3})$ is larger than zero, or $\alpha(i_{R3}-i_{L3}) > 0$, a switch 51 is closed and the instruction unit 32 compares $\alpha(i_{R3}-i_{L3})$ with the output $(+I_o+I_3)$ of the reference signal generator 31' thereby to effect the welding line follow-up operation as described hereinbefore. On the contrary, when the output $\alpha(i_{R3}-i_{L3})$ through the switch 25 is smaller than zero, or $\alpha(i_{R3}-i_{L3}) < 0$, a switch 52 is closed and hence the instruction unit 32 compares $\alpha(i_{R3}-i_{L3})$ with the output $(-I_o+I_3)$ of the other reference signal generator 31" thereby to effect the welding line follow-up operation in accordance with the result. More specifically, the functions of the two reference signal generators 31' and 31" in FIG. 16 can be performed by slightly modifying the circuitry of the reference signal generator 31 associated with the instruction unit 32 shown in FIG. 12. For this purpose, in FIG. 12, the variable resistor $R_{18}$ is adjusted so that a voltage signal developed across the resistor $R_{12}$ corresponds to $(+I_o+I_3)$ instead of $(+E_o)$. Furthermore, by adjusting the variable resistor $R_{19}$, a voltage signal corresponding to $(-I_o+I_3)$ is developed across the resistor $R_{13}$ instead of $(-E_o)$. By generating these two reference signals, the follow-up control along the welding line can be achieved in the signal-bevel welding as shown in FIG. 13. The detector 23 may be any element which produces an output proportional to the welding current. As an example of integration-store system, a transistor emitter follower circuit may be provided with a capacitor being connected to the collector of the transistor, the output from the capacitor being coupled to a field effect transistor (FET) source follower circuit, from which a final output is derived.

It should be understood that the present system is applicable not only to vertical welding but also to other attitude types of welding, tube welding and fillet welding. Furthermore, the weaving patterns need not be limited to the patterns 10 and 11 but the present system is effective to any other weaving patterns.

In the present invention, the following industrial advantages are presented:

The welding line can be followed up with the work pieces being not contacted with the system. Although a mechanical roll system has heretofore been used in a limited application, it was very sensitive to variations in welding sputter and irregurality of the bevel. The present control system is insensitive to the variations in the ambient conditions;

The time delay between the detecting point (right and left arc points) and the working point (arc point) is minimized in the present control system and an exact welding line follow-up is assured. In the prior art mechanical roll system, there existed a geometrical distance between the detection point (roll) and the working point (arc point), which caused time delay of the control;

The need of mounting a detector (such as mechanical roll, magnetic detector, photo-electric detector, etc), which has been encountered in the prior art system, is eliminated so that a problem of an obstacle for the welding operation is eliminated. Furthermore, although there occurred an unwelded portion at the position corresponding to the detector in the prior art system, no such unwelded portion occurs in the present invention and the welding operation time can be shortened. In addition, the time required to set the detector (mechanical roll, magentic detector, etc.) to the bevel prior to the welding operation is not necessary;

The present system can be applicable to an irregular bevel which has been cut by a gas cutter; and The present system enables man power saving in shipbuilding, bridge construction and field welding.

As described hereinabove, according to the present invention, the welding operation which could heretofore been carried out only by experienced operators can be carried out by unexperienced operators and manpower for the welding operation can be saved.

What is claimed is:

1. In a welding process wherein an electric arc is traveled along a mean predetermined path from which it tends to deviate, in which said arc as it travels along said path is also reciprocated transversely of said path between and alternately towards two opposite extreme positions, at least one of said lateral extreme positions being represented by a physically projecting wall element located alongside the travel path, and wherein the arc current tends to change in value when the arc approaches either extreme lateral position, the improvement in control of said arc mean travel position which comprises, in combination, the following steps:

(a) obtaining from the arc and storing separate timed signals indicative respectively of the arc current value when the arc is in the vicinity of said extreme positions in its transverse reciprocations, (b) comparing said stored signals from the opposite extreme positions with each other to obtain a control signal showing need to correct the mean lateral position of the arc with respect to the travel path when the difference between said compared signals indicates such need, and (c) using the control signal thus obtained to initiate correction of the arc mean travel position.

2. A follow-up control apparatus for controlling the movement of a weaving device mounting a torch in a consumable electrode type arc welder, wherein the welding torch weaves along a welding line, said follow-up control apparatus comprising;

means for detecting the amount of welding current during the weaving movement of said welding torch, memory means for storing the detected amount of welding current including the amounts of welding current obtained when said welding torch is positioned in the vicinity of the left and right ends with respect to the welding line, comparing means connected to said memory means for comparing the amounts of welding current in the vicinity of the left and right end positions of said welding torch and for providing an output signal representing a difference therebetween, means for generating a reference signal, instruction means for comparing the output signal of said comparing means with the reference signal and for providing an instruction signal depending upon the difference therebetween and representing which of the amounts of current in the vicinity of the left and right end positions of said welding torch is larger, and driving means responsive to said instruction signal, for shifting said weaving device either to the left or right with respect to the welding line.

3. A follow-up control apparatus according to claim 2, wherein said memory means comprises a pair of memories each connected to said detecting means through switch means, each of said pair of memories being adapted to store the amount of welding current obtained from either the left or right side weaving motion of said welding torch.

4. A follow-up control apparatus according to claim 2, wherein said memory means is connected to said detecting means through switching means and is adapted to store the amount of welding current obtained during the weaving motion of said welding torch to one side with respect to the welding line, and said comparing means is further connected to said detecting means directly for enabling comparison of the amount of welding current at one side of the weaving motion with a welding current at each position of said welding torch during one cycle of the weaving motion, and wherein further switching means is connected between said comparing means and said instruction means to deliver a compared output resulted from the comparison of the welding current at one end of the weaving motion and a welding current at the other end of the weaving motion of said welding torch.

5. A follow-up control apparatus according to claim 2, further comprising low-pass filter means connected between said detecting means and said memory means said low-pass filter means having a cut-off frequency lower than either of frequency components caused by short-circuiting of the consumable wire and caused by non-uniformity in the feeding of the consumable wire.

6. A follow-up control apparatus according to claim 3, further comprising a bias signal supply means connected to either of said pair of memories, said bias signal corresponding to the difference between the welding currents at the left and the right side ends of the weaving motion due to unsymmetry of a weaving pattern to be adopted and due to the difference between the left side and right side wire projection lengths thereby compensating for the unsymmetrical weaving pattern.

7. A follow-up control apparatus according to claim 2 wherein said reference signal generator generates two different reference signals corresponding to different welding currents at the left and the right side weaving motion of said welding torch due to unsymmetry of a weaving pattern to be adopted and due to the difference between the left side and right side wire projection lengths thereby compensating for the unsymmetrical weaving pattern.

* * * * *